April 21, 1931.                F. M. DOSCH                1,802,203
                        VEGETABLE AND ROOT SHREDDER
                           Filed April 13, 1928
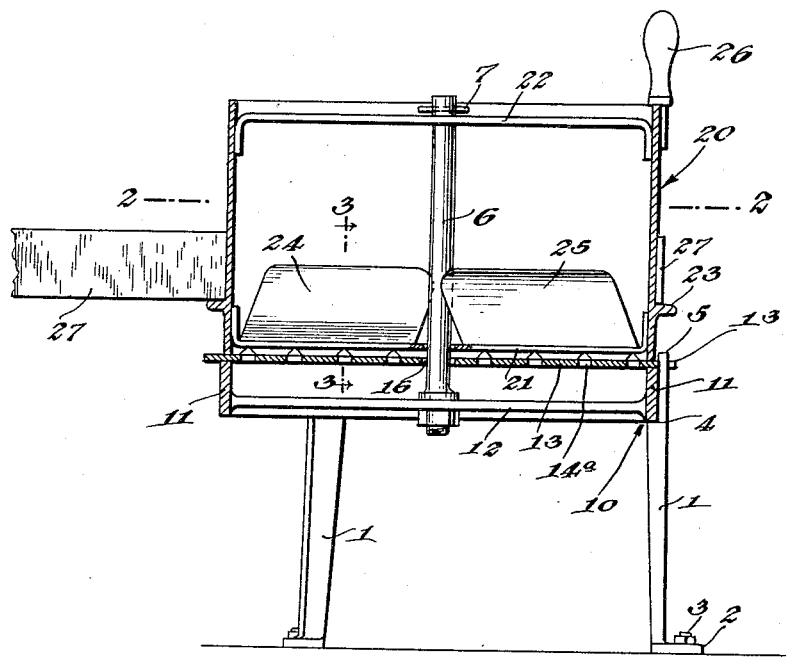
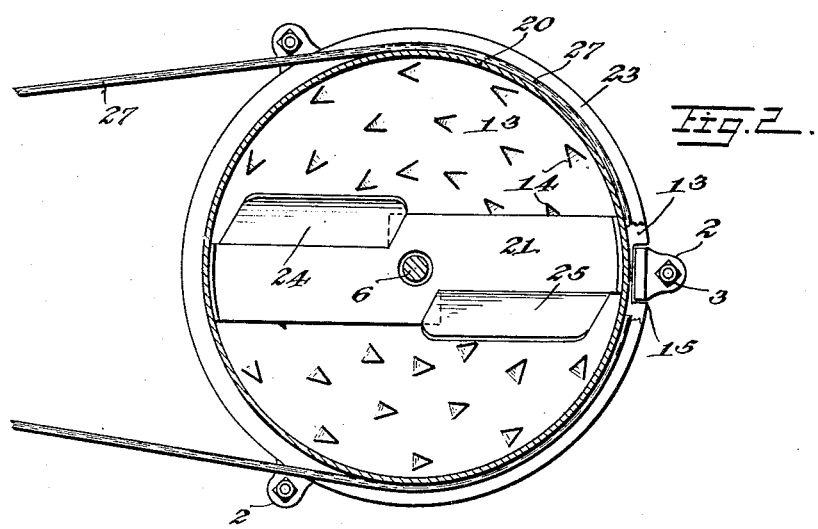
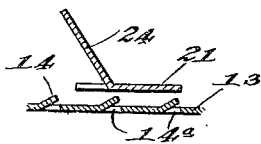
WITNESS                                              INVENTOR
H. T. Walker                                       Frank M. Dosch
                                                 BY
                                                      ATTORNEY Patented Apr. 21, 1931

1,802,203

UNITED STATES PATENT OFFICE

FRANK M. DOSCH, OF RICHLAND CENTER, WISCONSIN

VEGETABLE AND ROOT SHREDDER

Application filed April 13, 1928. Serial No. 269,685.

This invention relates to machines for shredding food stuffs such as vegetables and roots.

A primary object of the invention is to provide a machine of this character which while providing a rotary motion for the container eliminates all gears, journals, shafts and the like thereby greatly lessening the cost of the machine, placing it in the reach of small farmers and poultrymen.

This object is accomplished by using the hopper or container for a belt pulley whereby rotary motion is imparted to the container by the use of a driving belt only.

In carrying out these objects, the invention is susceptible of a wide range of modification without departing from the spirit or sacrificing any of the advantages of the claimed invention there being shown in the drawings for illustrative purposes a preferred and practical form, in which;

Figure 1 is a vertical section of a shredder constructed in accordance with this invention;

Fig. 2 is a horizontal section thereof taken on the line 2—2 of Fig. 1; and

Fig. 3 is a detail vertical section on line 3—3 of Fig. 1.

In the embodiment illustrated a plurality of supporting legs 1 are shown having lateral apertured feet 2 to receive bolts 3 by means of which the machine may be anchored to the floor. A spider-like supporting frame 10 is mounted on the upper ends of the legs 1 and comprises an upstanding cylindrical body or casing 11 having a skeleton bottom 12 and a cutter carrying plate or disk 13 mounted on its upper end. This plate 13 has up-struck pointed cutting teeth 14 with their cutting points extending circumferentially as shown in Fig. 2, and with openings 14ª beneath them.

This plate projects radially beyond the legs 1 and is notched or recessed as shown at 15 to interlockingly engage with up-standing portions 5 of the legs whereby the plate and legs are held against relative movement.

A spindle 6 rises from the center of bottom 12 through an opening 16 in plate 13 loosely through a bottom plate 21 and top plate 22 of a hopper or container 20. The plate 21 extends diametrically of the hopper at the center thereof and is comparatively narrow as is also the top plate 22.

This spindle operates as a journal on which the hopper or container revolves a cotter pin 7 being employed to hold the container on the spindle. The lower edge of container 20 rests on and is supported by plate 13 with the bottom member 21 thereof spaced above it. (See Fig. 1.) An annular flange 23 extends laterally from the outer face of the container and forms a rest for the driving belt 27 which is trained around the container and operates to rotate it.

From the opposite edges of the plate 21 at diametrically opposite corners rise feeding wings or blades 24 and 25 which are preferably struck out of plate 21 and operate to force the material to be shredded into contact with the cutters 14 which latter cut and pass the strips through the openings 14ª into a receptacle placed below the container.

A handle 26 is preferably attached to the container 20 to facilitate the manipulation thereof.

It will thus be seen that there is only one movable part in this machine, which is the hopper and which performs the double function of a container and a pulley receiving motion from the belt 27. Hence this shredder may be cheaply manufactured and put within the reach of all.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

The combination with a supporting structure, a spider-like frame mounted on said structure and comprising an upstanding cylindrical portion with a skeleton bottom, a cutter disc mounted on said frame and held against relative movement thereof, said disc having upstruck cutting teeth with their cutting points extending circumferentially, said teeth being arranged in radially spaced concentric rows with the teeth of one row staggered in relation to those of adjacent rows, a spindle rising from said frame and extending through the cutting disc, a hopper mounted to rotate on said spindle and having feeding blades to force the material to be shredded into contact with the cutting teeth, and a belt trained around said hopper for imparting rotary motion thereto.

FRANK M. DOSCH.